United States Patent [19]
Schwamborn et al.

[11] Patent Number: 6,140,411
[45] Date of Patent: Oct. 31, 2000

[54] EXTRUDABLE HALOGEN-FREE MIXTURE

[75] Inventors: Klaus Schwamborn; Walter Steffes; Manfred Sikora, all of Wipperfuerth, Germany

[73] Assignee: Eilentropp KG, Wipperfuerth, Germany

[21] Appl. No.: 09/305,118

[22] Filed: May 4, 1999

[30] Foreign Application Priority Data

May 6, 1998 [DE] Germany .............................. 198 20 095

[51] Int. Cl.$^7$ ...................................................... C08L 83/00

[52] U.S. Cl. ............................................................. 524/588

[58] Field of Search .............................................. 524/588

[56] References Cited

U.S. PATENT DOCUMENTS 5,986,016  11/1999  Puyenbrock et al. .................... 525/420

FOREIGN PATENT DOCUMENTS 0 417 513 A1  3/1991  European Pat. Off. .
WO 94/27298  11/1994  WIPO .

OTHER PUBLICATIONS

General Electric Company, *GE Plastics, ULTEM Profile*.

Primary Examiner—Edward J. Cain
Attorney, Agent, or Firm—Birch, Stewart, Kolasch & Birch, LLP

[57] ABSTRACT

Extrudable halogen-free mixture comprising 95–5 weight-% polyetherimide polymer with an elastic modulus greater than 2000 MPa and 5–95 weight-% flexible siloxane-polyetherimide copolymer with an elastic modulus of less than 2000 MPa. Electrical cable or wiring insulated with the extrudable halogen-free mixture comprising 60–90 weight-% of a polyetherimide polymer with an elastic modulus greater than 2000 MPa and 40–10 weight-% of a flexible siloxane-polyetherimide copolymer with an elastic modulus of less than 1000 MPa. Electrical or optical cable or tubing sheathed with the extrudable halogen-free mixture comprising 40–10 weight-% of a polyetherimide polymer with an elastic modulus greater than 2000 MPa and 60–90 weight-% of a flexible siloxane-polyetherimide copolymer with an elastic modulus of less than 1000 MPa. The extrudable halogen-free mixtures may additionally comprise reinforcement elements selected from the group consisting of glass fibers, carbon fibers, and mixtures thereof, flame-retardant additives selected from the group consisting of aluminum hydroxide, magnesium hydroxide, and mixtures thereof, and color pigments. The extrudable halogen-free mixtures may be cross-linked. A process for the manufacture of workable granulates of an extrudable halogen-free mixture which comprises the steps of: a.) drying a polyetherimide polymer with an elastic modulus greater than 2000 MPa, b.) drying a flexible siloxane-polyetherimide copolymer with an elastic modulus less than 2000 MPa, c.) combining 95–5 weight-% of said polyetherimide polymer with an elastic modulus greater than 2000 MPa with 5–95 weight-% of said flexible siloxane-polyetherimide copolymer with an elastic modulus of less than 2000 MPa to form a mixture batch, d.) melting said mixture batch to form a melt, and e.) extruding said melt to produce a workable granulate.

11 Claims, No Drawings

EXTRUDABLE HALOGEN-FREE MIXTURE

FIELD OF THE INVENTION

This invention provides extrudable mixtures of a polyetherimide polymer having an elastic modulus greater than 2000 MPa and a siloxane-polyetherimide copolymer having an elastic modulus less than 2000 MPa. The mixtures are halogen-free and may be employed as insulation or coatings on electrical wiring, fiber optical cables, and the like.

BACKGROUND OF THE INVENTION

The present invention concerns extrudable halogen-free mixtures based on polyetherimide polymer.

The use of siloxane-polyetherimide copolymer for improvement of flame-retardance of wires is known, as is the manufacture of insulation or coverings of electrical cables from materials of like flame-retardance (WO 94/27298).

EP 0 417 513 A1 discloses a procedure in which small quantities (0.2–15 weight-%) of a siloxane-polyetherimide copolymer is blended with a polyetherimide polymer for the same purposes. In this case, polyetherimides that are commercially available from the General Electric Company ("GCE") as ULTEM 1000, 5000, and 6001 were used. These were blended with ULTEM D9000, a siloxane-polyetherimide copolymer also available from GEC. The resistance to abrasion of these materials is relatively high, as Is their impact strength. These materials are less well adapted for use in flexible cable applications. Within cost limitations, these materials find broad usage, but their employment has been limited, up to now, to items manufactured by injection molding.

There is currently available, also from GEC, a polyetherimide polymer that can be employed in injection molding as well as for extrusion. This so-called flexible copolymer is available as SILTEM (ULTEM Profile, Introduction, ULTEM Polyetherimide Resins). This resin is characterized not only by its flexibility, but also by its high resistance to abrasion and chemical attack. The high price for this copolymer limits its applications to special areas where cost is of little importance.

According to the information from the manufacturer (ULTEM Profile 3, Product Selection), while the elastic modulus for ULTEM 9075 is 3000 MPa, that of SILTEM is approximately 475 MPa.

As far as the present invention is concerned, in contrast to the teachings of EP 0 417 513 A1, one does not introduce small amounts of siloxane-polyetherimide copolymer as an additive to improve the flame-retardance of a polyetherimide polymer. Rather, the present invention provides a mixture of a polyetherimide polymer with a sufficient quantity of a flexible siloxane-polyetherimide copolymer to improve the workability of the polyetherimide polymer, so that new products can open new areas of application.

SUMMARY OF THE INVENTION

According to the present invention, a mixture based on polyetherimide polymer, is comprised of 5–95 weight-% of flexible siloxane-polyetherimide copolymer having an elastic modulus less than 2000 MPa and 95–5 weight-% of a polyetherimide polymer having an elastic modulus greater than 2000 MPa. The relative amounts of the two components of the mixture is determined by the intended end use, as discussed below.

Mixtures based on polyetherimide polymers are inherently hard. They are modified herein by the addition of a flexible siloxane-polyetherimide copolymer. Such mixtures are of advantage for thin-walled coatings, such as electrical conductors. A combination of a flexible siloxane-polyetherimide copolymer with a polyetherimide wherein the ratio of the components represents a more pliable application of the polymer materials to be used for, for instance, an outer mantle of electrical cable is also disclosed herein.

These mixtures thus permit economical employment not only the area of electrical cables and wiring but also with cables and wiring that may contain optical fibers. In this way, there may be achieved, by an appropriate proportioning of the two components in the total composition, an adaptation to a desired field of application, that is, to the mechanical characteristics thereof.

The invention thus includes the recognition that in only one polymerization procedure, with the siloxane-containing-polyetherimide copolymer being combined with additional polyetherimide beyond that incorporated in the original polymerization process (using a prescribed quantity), alterations in characteristics can be effected. This is of special advantage, since in the use of this procedural step, no further additives are necessary, which additives may, in some cases, cause disturbances in the final properties of the profile of properties of the material.

DETAILED DESCRIPTION OF THE INVENTION

As noted above, the choice of components may be varied in accordance with the purpose of the end-use application. The incorporation of the polyetherimide polymer with an elastic modulus greater than 2000 MPa with the flexible polyetherimide-siloxane copolymer provides here a decline in the hardness value of the mixture, which consists of the two amorphous components, and which mixture can now be extruded.

If the concern is principally with electrical cable and wiring, or the insulation of electrical windings, etc., one may employ a mixture comprised of 60 to 90 weight-% of a polyetherimide polymer having an elastic modulus greater than 2000 MPa and 40 to 10 weight-% of a flexible siloxane-polyetherimide copolymer having an elastic modulus less than 1000 MPa.

If, on the other hand, walls of greater thickness are desired in cable or wiring construction, which still possess sufficient flexibility, then the mixture to be selected would be comprised of 60 to 90 weight-% of a flexible siloxane-polyetherimide copolymer having an elastic modulus less than 1000 MPa and 40 to 10 weight-% of a polyetherimide polymer.

Besides the electric cables and wiring mentioned above, advantageous applications can be found for this material in making coatings or sheathing, as well as in optical cables and conductors, wherein, for example, plastic tubular casings which enclose the optical fibers are made of a mixture in accord with the invention. Further, self-supporting elements, such as tubes for the transport of liquid or gaseous media can be varied in their characteristic profiles, by the choice of corresponding relative ratios of the two components.

Starting with a mixture ratio of 50:50 by weight of a flexible polyetherimide-siloxane copolymer (SILTEM) and a polyetherimide polymer (ULTEM) in a lend, in order to achieve a firmer extrudate, the mixture ratios can be changed in the direction of 40:60 by weight or even so much as 30:70 by weight (SILTEM:ULTEM), in accordance with the specified requirements. In contrast, if a softer extrudate is required, then from the original 50:50 blend by weight the apportionment of SILTEM to ULTEM may be increased somewhat in the direction of, by weight, 60:40, 70:30, or 80:20.

The present invention provides a mixture of a polyetherimide polymer with a sufficient quantity of a flexible siloxane-polyetherimide copolymer to improve the workability of the polyetherimide polymer, so that new products can open new areas of application.

A key feature of the present invention in this matter is to present a substantially smaller elastic modulus for usage of a flexible siloxane-polyetherimide polymer known under the designation SILTEM in contrast to that of the siloxanepolyetherimide copolymer, namely the ULTEM D9000 of GEC. As noted above, the elastic modulus for ULTEM 9075 lies at 3000MPa in contrast to that of SILTEM which of general magnitude of 475 MPa. Moreover, SILTEM Is characterized by a lower density of 1.18 g/cm$^3$ and a lower tensile strength, namely only 20 MPa.

Generally, mixtures in accord with the invention, as is conventional with polymer materials, can be reinforced against the action of external mechanical forces by the inclusion of additives such as glass or carbon fibers.

Demands for flame-retardant halogen-free mixtures are being presented by industry on an increasing scale. Again, so far as the present Invention Is concerned, the invention complies with such requirements, since known flame retardant additives, such as aluminum and/or magnesium hydroxide can be added to the mixture, which addition leads to a substantial increase in resistance to flame.

The mixtures proposed by the invention can be cross-linked. The cross linking can be effected in a conventional manner, for instance by means of peroxide cross-linking, usually after the extrusion of the material comprised of the two materials.

Also, the invented mixture can contain coloring materials, which, for instance, In the form of carbon black, can reduce the damaging influence of ultraviolet light for a produced product, or even a coloration of the mixture can be provided in optional hues for a colored recognition mark and thus serve for the differentiation of individual products.

Process for Manufacture of Mixture

A process for the manufacture of the mixture of the two components, that is, polyetherimide polymer and siloxane-polyetherimide copolymer, is also an Important aspect of the present invention. In accord with the invention, first, the mixing components, each pre-dried, are combined. The dry batch is then melted and the melt is extruded, whereby, a processing-ready granulate is made from the extrudate. This granulate can, in conventional extruders, be further worked for the production of a sheathing, for instance, as electrical insulation or a protective layer.

Occasionally, it can also be of advantage, to immediately convey the melt obtained from the melted batch of the two components directly to equipment for product manufacture, for instance to an extruder for the production of protective tubes for the enclosures of cables or the like.

The advantages presented for the invented mixtures are principally based on the fact that after the physical mixing of the two components and during the melting of such a batch, the flexible polyetherimide polymer is now bound to the siloxane by a polymerization process and then forms a common matrix with an added polyetherimide polymer. This added polyetherimide polymer is independent of the previous two components, but the siloxane-component embeds itself therein. In accordance with the proportion of one or the other component, the siloxane molecule is found in a uniformly dispersed, or a dense apportionment in the polyetherimide-matrix. That is, in accordance with the excess weight of the one or the other component, the characteristic picture of the invented mixture continually changes.

As a process temperature upon melting the batch of the two components, i.e. flexible siloxane-polyetherimide copolymer and polyetherimide polymer, a temperature of 250 to 350° C. has been found to be particularly advantageous. The actual process temperature from time to time is dependent upon which additional components, for instance additives for flame retardant, etc., the mixture of the invention contains.

While this invention has been disclosed with reference to specific embodiments, those skilled in the art are taught principles by the present specification that will enable them to practice other, different specific embodiments thereof, and accordingly the scope of the invention patented is determined only by the appended claims.

What is claimed is:

1. An extrudable halogen-free mixture comprising 80–20 weight-% of a polyetherimide polymer with an elastic modulus greater than 2000 MPa and 20–80 weight-% of a flexible siloxane-polyetherimide copolymer with an elastic modulus of less than 2000 MPa.

2. The extrudable halogen-free mixture of claim 1, comprising 60–80 weight-% of a polyetherimide polymer with an elastic modulus greater than 2000 MPa and 40–20 weight-% of a flexible siloxane-polyetherimide copolymer with an elastic modulus of less than 1000 MPa.

3. The extrudable halogen-free mixture of claim 1, comprising 40–20 weight-% of a polyetherimide polymer with an elastic modulus greater than 2000 MPa and 60–80 weight-% of a flexible siloxane-polyetherimide copolymer with an elastic modulus of less than 1000 MPa.

4. The extrudable halogen-free mixture of one of claims 1–3, additionally comprising reinforcement elements selected from the group consisting of glass fibers, carbon fibers, and mixtures thereof.

5. The extrudable halogen-free mixture of one of claims 1–3, additionally comprising flame-retardant additives selected from the group consisting of aluminum hydroxide, magnesium hydroxide, and mixtures thereof.

6. The extrudable halogen-free mixture of one of claims 1–3, wherein the polymer and copolymer components of the mixture are cross-linked.

7. The extrudable halogen-free mixture of one of claims 1–3, additionally comprising color pigments.

8. Electrical cable or wiring insulated with the extrudable halogen-free mixture of claim 2.

9. Electrical or optical cable or tubing sheathed with the extrudable halogen-free mixture of claim 3.

10. A process for the manufacture of workable granulates of an extrudable halogen-free mixture which comprises the steps of:
   a.) drying a polyetherimide polymer with an elastic modulus greater than 2000 MPa,
   b.) drying a flexible siloxane-polyetherimide copolymer with an elastic modulus less than 2000 MPa,
   c.) combining 80–20 weight-% of said polyetherimide polymer with an elastic modulus greater than 2000 MPa with 80–20 weight-% of said flexible siloxane-polyetherimide copolymer with an elastic modulus of less than 2000 MPa to form a mixture batch,
   d.) melting said mixture batch to form a melt, and
   e.) extruding said melt to produce a workable granulate.

11. The process of claim 9, wherein said mixture batch is melted at a temperature in the range 250–350° C.

* * * * *